Figure 1:
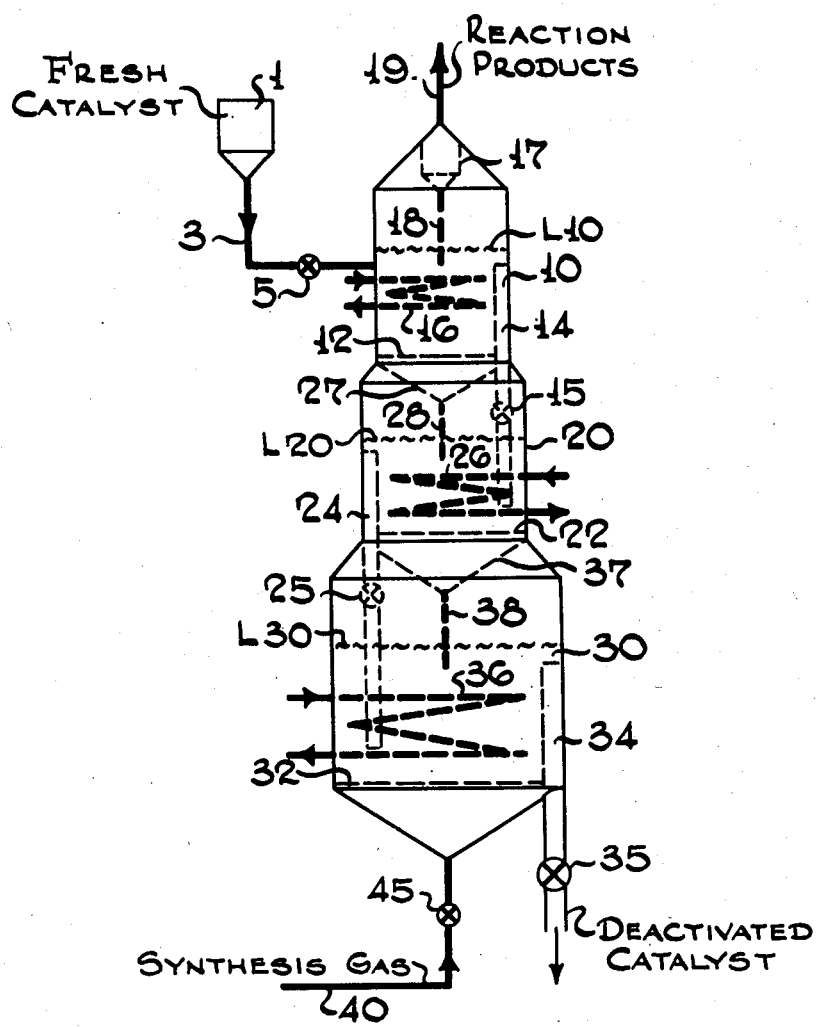

April 19, 1949.  F. T. BARR  2,467,802
HYDROCARBON SYNTHESIS

Filed Dec. 14, 1945  2 Sheets-Sheet 1

Fig.—1

Frank T. Barr  Inventor
By P. J. Whelan  Attorney

UNITED STATES PATENT OFFICE 2,467,802

HYDROCARBON SYNTHESIS

Frank T. Barr, Summit, N. J., assignor to Standard Oil Development Company, a corporation of Delaware Application December 14, 1945, Serial No. 635,100

11 Claims. (Cl. 260—449.6)

The present invention relates to improvements in controlling the activity of catalysts used in catalytic processes employing the fluid catalyst technique. More particularly, the invention is concerned with a process of controlling the activity of catalysts used in the catalytic synthesis of hydrocarbons and oxygenated organic compounds from carbon oxides and hydrogen, employing the fluid catalyst technique.

It is known in the art that the activity of catalysts used in the synthesis of hydrocarbons from CO and $H_2$ gradually declines during the course of the reaction, causing a corresponding drop in the rate of conversion and the yields of desired products. Depending on the type of catalyst used, the purity of the synthesis gas and the reaction conditions of temperature, pressure, gas composition and flow rate, the deactivation may be the result of one or more of such causes as the deposition of high-molecular involatile reaction products, such as paraffin wax, on the catalyst, poisoning by sulfur compounds contained in the synthesis gas, dissolution of the active catalyst component in oxygenated liquid reaction products, undesired chemical reactions between the active catalyst component and the reactants or reaction products, etc. In most cases, if the catalyst deactivation is unchecked, the rate of conversion may drop within a relatively short time of say two to ten days appreciably below optimum and even below economic levels.

The decrease in catalyst activity may be counterbalanced to a certain extent by a corresponding gradual rise of the reaction temperature. However, the reaction temperature may not be raised by more than about 50° to 75° F. above the optimum temperature for fresh catalyst without detrimentally affecting the highly temperature-sensitive synthesis reaction resulting in the formation of excessive amounts of undesired gases and coke. These conditions have led to relatively frequent shut-downs of fixed bed synthesis plants for the purpose of replacing the deactivated catalyst with fresh or regenerated material. The application of the fluid catalyst technique to the hydrocarbon synthesis has removed this difficulty. This technique, employing the catalyst in the form of a dense turbulent mass of finely-divided solids fluidized by the gaseous reactants and reaction products, permits continuous or periodic addition and withdrawal of powdered catalyst to and from the fluidized catalyst phase. The procedure affords satisfactory control of catalyst activity without variation of the reaction temperature and without interference with the continuity of the process.

However, the last-mentioned method of operation has another serious drawback. As a result of the high turbulence and uniform gas and solids distribution which are characteristic for the fluid catalyst phase, the catalyst activity is likewise practically uniform throughout the catalyst phase. Thus, when it is attempted to control catalyst activity by the continuous or periodic introduction of fresh catalyst to the reactor and the simultaneous removal of deactivated catalyst from the reactor, actually catalyst of average activity is removed rather than catalyst of lowest activity as would be desirable. This is true in principle no matter how far the points of catalyst introduction and withdrawal are apart. Alternate withdrawal of deactivated catalyst and introduction of fresh catalyst results in considerable fluctuations of catalyst bed volume and seriously interferes with the continuity of the process.

The present invention overcomes the aforementioned difficulties and affords various additional advantages. These advantages, the nature of the invention and the manner in which it is carried out will be fully understood from the following description thereof read with reference to the drawing which shows semi-diagrammatic views of apparatus adapted to carry out the invention.

A main object of my invention is to provide an improved method for controlling the activity of catalysts used in the catalytic synthesis of hydrocarbons from CO and $H_2$ employing the fluid catalyst technique.

Another object of my invention is to provide a new method of maintaining a constant catalyst activity in a fluid catalytic reactor for the synthesis of hydrocarbons without affecting the continuity of the synthesis reaction, the reaction temperature and the volume of the catalyst bed.

Other objects and advantages will appear hereinafter.

I have found that these objects may be accomplished quite generally by employing multistage series operation in fluid technique plants and charging each stage with catalyst withdrawn from a subsequent stage in the order of flow of synthesis gas. For example, fresh synthesis gas may be supplied to the first of a series of fluid catalyst zones and from this first zone to one or more subsequent fluid catalyst zones. Fresh or regenerated catalyst may be charged to a last fluid catalyst zone while fluid catalyst of average activity is withdrawn therefrom, preferably at the same rate, and charged to the next preceding zone wherein it is further deactivated in contact with relatively fresh synthesis gas. The average catalyst activity in this latter zone will be lower than that in said first catalyst zone. This procedure may be repeated until catalyst of lowest average activity is maintained in and may be withdrawn from said first fluid catalyst zone which receives the fresh synthesis gas. It will be readily appreciated that operation in this manner permits the maintenance of constant catalyst activity within each of the various catalyst zones and the withdrawal exclusively of catalyst of lowest activity without affecting the continuity of the process. As a result, smaller amounts of fresh catalyst are required to maintain such conditions as will produce an optimum quantity of the desired product. In addition, my new procedure has the highly desirable further advantage of contacting the fresh and most reactive synthesis gas with catalyst of lowest activity while fresh highly active catalyst is contacted only with partially spent and less reactive synthesis gas. This arrangement permits improved reaction control and eliminates dangers of superheating, reaction runaways and excessive cracking.

As mentioned before, two or more stages may be used which may be operated either in a completely continuous manner or intermittently at intervals, depending on the deactivation rate of the catalyst. The various fluid catalyst zones may be either arranged in separate reactors or combined in a single reactor which may be subdivided by perforated grids into various preferably superimposed reaction zones. Reaction products may be separated from the synthesis gas between two successive catalyst zones. However, these reaction products have been found not to interfere with the proper course of the reaction in any subsequent catalyst zones and the reactants may be passed from zone to zone without intermediate product removal. The choice between these two modifications of my process may be made dependent on the rate of catalyst deactivation for the following reasons. If the reactants are passed from zone to zone without intermediate product removal by cooling and liquid scrubbing, a substantial amount of catalyst entrained in the gases and vapors is carried from zone to zone even at the lowest operative gas velocities and notwithstanding the most efficient dry gas-solids separation between zones. This phenomenon tends to equalize catalyst activity throughout the various zones and thus to counteract the ultimate purpose of the present invention. The equalizing effect of catalyst carry-over will be less pronounced at high than at low catalyst circulation rates in the opposite direction and will practically disappear when the rate of this catalyst circulation is sufficiently high, e. g., of a higher order of magnitude than the rate of catalyst carry-over. In accordance with my invention, the rate of catalyst circulation is preferably made a function of the rate of catalyst deactivation, that is, the higher the rate of catalyst deactivation the higher I choose the rate of fresh catalyst feed and spent catalyst withdrawal. As a general rule, therefore, it may be advisable to remove the reaction products between zones by means of cooling and liquid scrubbing with attending separation of entrained catalyst if the deactivation rate is low, for example in the case of the high pressure synthesis employing iron catalysts. Catalyst thus separated may be returned to the zone from which it was carried away. However, when the rate of catalyst deactivation is high, for example in the case of involatile hydrocarbonaceous deposits particularly on cobalt catalysts, I may prefer to pass the reactants from zone to zone together with entrained catalyst without intermediate product removal and to rely on the higher catalyst feed and withdrawal rate to eliminate the detrimental effect of catalyst carry-over.

The reaction conditions of temperature, pressure, gas composition and flow rate, as well as the catalysts used, are those known in the art of hydrocarbon synthesis employing the fluid catalyst technique. Reaction conditions operative in all catalyst zones of my process comprise temperatures of about 350°–800° F., pressures of about atmospheric to about 500 lbs./sq. in. gauge and synthesis gas compositions of about 0.2 to 2 mols of CO per mol of $H_2$, the lower brackets of these ranges being preferred for cobalt, the higher brackets for iron catalysts in a manner known per se. The particle size of the catalyst may vary from about 400 mesh to ¼ inch diameter, mainly depending on the specific gravity of the catalyst and the superficial velocity of the gases in the catalyst zones, which may fall between the broad ranges of 0.3 to 10 ft. per second. The throughput of powdered catalyst to and from the system and from zone to zone may be accomplished by any conventional means, such as mechanical screw or star feeders, overflow pipes, standpipes, pneumatic means, etc.

Figure 2:
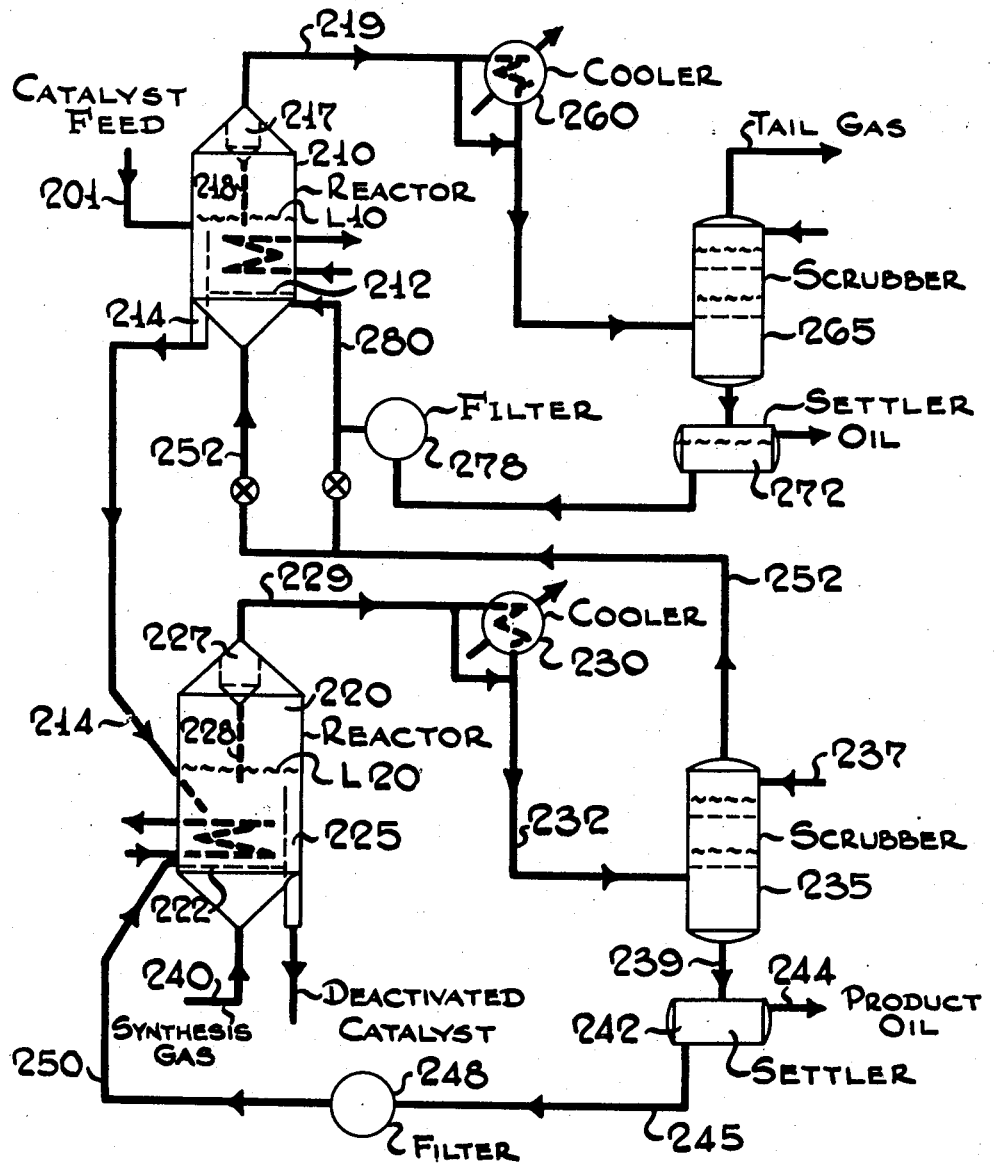

Having set forth the general nature and objects, the invention will be best understood from the more detailed description hereinafter, in which reference will be made to the accompanying drawing wherein Fig. 1 is a semidiagrammatic illustration of a single-reactor system suitable for carrying out one modification of the present invention, and Fig. 2 is a partly schematic, partly diagrammatic illustration of a multi-reactor system suitable for carrying out another modification of the invention.

Referring now in detail to Fig. 1, the system illustrated therein will be described below in connection with the production of normally liquid and solid hydrocarbons from CO and $H_2$, using a finely-divided cobalt catalyst in a continuously operating fluid catalyst reactor, which involves a relatively high rate of catalyst deactivation due to high-molecular hydrocarbonaceous catalyst deposits such as paraffin wax. It should be understood, however, that the apparatus is readily adaptable to other conversions involving similar rates of catalyst deactivation. The system consists essentially of three superimposed conversion zones 10, 20 and 30, which are consolidated into a single vertical reactor and separated by horizontal perforated plates or grids 12 and 22. Overflow standpipes 14 and 24, which may be provided with control valves 15 and 25, take care of the transport of finely-divided catalyst from zone 10 to zone 20 and from zone 20 to zone 30. Standpipe 34 provided with control valve 35 serves the withdrawal of catalyst from the system.

In operation, fresh or regenerated finely-divided cobalt catalyst of fluidizable particle size, which may be supported on a siliceous carrier, such as kieselguhr, silica gel or the like, is fed from feed hopper 1 through line 3 provided with control valve 5 to zone 10 by any conventional means such as mechanical conveyors, aerated standpipes, etc. Fresh synthesis gas comprising CO and $H_2$ in the desired proportions is supplied through line 40 provided with control valve 45 to zone 30, preferably at a point below grid 32. The powdered catalyst forms in zone 10 a dense turbulent mass of solids having a well-defined upper level $L_{10}$, fluidized by the gaseous reactants and vaporous and gaseous reaction products entering zone 10 from zones 20 and 30 through grid 12. Overflowing catalyst passes through standpipe 14 to zone 20 to form therein in a similar manner a dense fluidized catalyst phase having an upper level $L_{20}$. From zone 20 overflowing catalyst passes through standpipe 24 to zone 30 to form therein a dense fluidized mass with an upper level $L_{30}$, from which catalyst is withdrawn through standpipe 34 for wax recovery and catalyst regeneration.

The upwardly flowing fresh synthesis gas undergoes partial conversion in zone 30 in contact with catalyst of lowest activity derived from the subsequent conversion zones 10 and 20. Vaporous conversion products and unconverted reactants pass from zone 30 into a conventional centrifugal and/or electrical gas-solids separator 37 in which the bulk of entrained catalyst is removed to be returned through pipe 38 to the dense catalyst phase in zone 30. Vapors and gases of a substantially reduced content of reactants and entrained solids enter the dense catalyst phase of zone 20 through grid 22 to undergo further but still incomplete conversion of CO and $H_2$ in contact with catalyst of higher average activity. The gases and vapors taken overhead from zone 20 are passed through gas-solids separator 27 equipped with solids return pipe 28 and from there through grid 12 into the dense catalyst phase of zone 10 wherein the conversion of the remaining proportions of CO and $H_2$ takes place in contact with free catalyst of highest activity. Final vaporous and gaseous conversion products together with any unconverted synthesis gas are taken overhead from zone 10 passed through gas-solids separator 17, provided with solids return pipe 18, and removed from the reactor through line 19 to be processed for the recovery of the desired products. Catalyst carried out of separator 17 and recovered in the product recovery system (not shown) may be returned to feed hopper 1. Unconverted synthesis gas may be recycled to feed gas line 40 after or prior to complete product removal.

The diameters of zones 30, 20 and 10 are shown in the drawing to taper off in the direction of the gas flow. This feature is desirable in order to compensate for the gas contraction taking place in the course of the conversion, which may be illustrated by the following reaction mechanism:

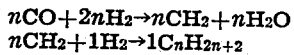

Gradual reduction of the diameters as indicated permits the maintenance of approximately constant space and superficial velocities of gases and vapors in all zones, which facilitates control of conversion and fluidization. Heat of reaction may be removed from the reaction zones by way of cooling means 16, 26 and 36 arranged respectively within the dense catalyst phases of zones 10, 20 and 30. These cooling means may be of any conventional design such as cooling coils supplied with a flowing coolant or coils filled with coolant having a constant boiling point at the desired temperature, or the like.

It will be readily understood that the system illustrated by Fig. 1 permits the maintenance of constant catalyst activity in each conversion zone and the withdrawal exclusively of catalyst of lowest activity. This may be accomplished either by continuous catalyst circulation in the manner indicated or by periodic but simultaneous feed of fresh catalyst and withdrawal of spent catalyst. As a result of the countercurrent flow of catalyst and synthesis gas and the changing diameter of the reaction zones, the optimum conditions of temperature, pressure, and gas velocities may be approximately the same in all zones, while the dense phase levels may be easily maintained constant. If desired, only two or more than three conversion zones may be used.

The system is particularly adapted to carry out conversions involving high rates of catalyst deactivation and replacement, such as the hydrocarbon synthesis on cobalt catalysts which entails relatively rapid deposition on the catalyst of involatile carbonaceous material such as paraffin wax. In these cases the high catalyst replacement rate will over-compensate any activity-equalizing effect of catalyst entrained in the gases and carried over from zone to zone. Preferred operating conditions for the production of more than 150 g. of liquid and solid highly saturated hydrocarbons per normal cu. m. of synthesis gas by this embodiment of my invention may vary within the approximate ranges given below:

| | |
|---|---|
| Catalyst composition | 20–35% of Co on silica gel |
| Catalyst particle size | 15–60% through 325 mesh |
| Temperature | 375°–450° F. |
| Pressure | 5–10 atm. abs. |
| Molar ratio CO:$H_2$ | 0.2–0.8:1 |
| Space velocity (volume of gas/volume of catalyst/hr. measured at 60° F. and 1 atm. abs.) | 200–500 |
| Superficial gas velocity | $\leq 1.5$ ft./sec. |
| Rate of complete catalyst replacement | 10–50 days |
| Rate of conversion (based on CO+$H_2$ in original feed gas): | |
| 1st stage (zone 30) | 33–50% |
| 2nd stage (zone 20) | 33–35% |
| 3rd stage (zone 10) | 33–15% |

Another embodiment of my invention, which is adapted to carry out conversions involving any rate and particularly slow rates of catalyst deactivation and replacement is illustrated in Fig. 2. The system as shown therein essentially comprises two separate fluid catalytic reactors 210 and 220 which cooperate through a catalyst circulation pipe 214 and a gas line 252 originating from a product recovery system connected with reactor 220, as will appear hereinafter. While the operation of this system will be described with specific reference to the high-temperature high-pressure conversion of CO and $H_2$ on iron catalysts involving relatively slow catalyst deactivation and replacement, it is noted that the same or a similar system may be used for conversions involving different rates of catalyst deactivation.

Referring now in detail to Fig. 2, fresh or relatively fresh iron catalyst of fluidizable particle size is passed to reactor 210 through line 201 by any conventional means such as pressurized feed hoppers, standpipes, etc. to form in reactor 210 above grid 212 a dense turbulent catalyst phase having a well-defined upper level $L_{10}$, and fluidized by tail gas from reactor 220, supplied from below grid 212, as will appear more clearly hereinafter. Overflow catalyst of an average activity which is somewhat lower than that of the fresh catalyst is withdrawn through overflow standpipe 214 and passed, by means of standpipe pressure, multiple standpipes, screw feeders or the like, to reactor 220 to form therein above grid 222 a dense turbulent catalyst phase with an upper level $L_{20}$, fluidized by fresh or relatively fresh synthesis gas supplied through line 240 to reactor 220 at a point below grid 222. Catalyst of relatively low average activity is withdrawn through overflow standpipe 225.

The synthesis gas supplied through line 240 and grid 222 undergoes partial conversion in reactor 220 in contact with catalyst withdrawn from and partially deactivated in reactor 210, which is thereby further deactivated. Product gases and vapors together with unreacted synthesis gas pass overhead from the catalyst phase in reactor 220 to a conventional gas-solids separator 227 from which the bulk of entrained catalyst is returned to reactor 220 through pipe 228. Gases and vapors of substantially reduced solids content flow through line 229 and, if desired, through a cooler 230 to a scrubber 235 by way of line 232. Scrubber 235 is supplied through line 237 with a liquid scrubbing agent such as water, hydrocarbon oil or the like, to remove liquid and soluble conversion products as well as all entrained catalyst from the gas. Rich scrubbing liquor leaves scrubber 235 through line 239 to enter settler 242 from which liquid conversion products are removed overhead through line 244 for further processing. Settler bottoms containing catalyst are passed through line 245 to filter 248, leaving thereon a catalyst filter cake. Filtered and dried catalyst may be returned through line 250 to the dense catalyst phase in reactor 220 by any conventional means such as mechanical conveyors, pneumatic means or the like (not shown). If desired, synthesis gas from line 240 may be used for this purpose in any manner known per se.

Tail gas essentially consisting of unconverted CO and $H_2$ and small proportions of gaseous reaction products, but free of any entrained catalyst, is withdrawn overhead from scrubber 235 through line 252 to enter reactor 210 below grid 212 and to be further converted therein in contact with relatively fresh iron catalyst. Volatile reaction products and any unconverted reactants are withdrawn overhead from reactor 210 through gas-solids separator 217 provided with solids return pipe 218, and withdrawn through line 219 to be further treated in cooler 260, scrubber 265, settler 272 and filter 278, as outlined above in connection with the volatile products leaving reactor 220 through line 229. Dry catalyst from filter 278 may be returned to reactor 210 with the aid of tail gas from line 252 passed through line 280, as indicated on the drawing.

It will be appreciated from the foregoing description that the average catalyst activity in reactor 210 is entirely unaffected by the activity of the catalyst in reactor 220 since catalyst carry-over from reactor 220 to reactor 210 is completely eliminated. Therefore, a substantial activity gradient will develop from reactor 210 to reactor 220 even at the lowest rates of catalyst deactivation and resulting catalyst replacement and the catalyst removed from reactor 220 will in all cases have an average activity substantially lower than that of the catalyst removed from reactor 210. As explained in connection with zones 10, 20 and 30 of Fig. 1, reactor 220 may have a larger diameter than reactor 210 in order to compensate for the reduction of the gas volume caused by the conversion in reactor 220 and to make possible the maintenance of constant similar reaction conditions in both reactors. Preferred ranges of such conditions for the hydrocarbon synthesis on iron catalysts to produce more than 150 g. of liquid, relatively unsaturated hydrocarbons are given below:

| | |
|---|---|
| Catalyst composition | Reduced iron sesquioxide, unsupported |
| Catalyst particle size | 15–60% through 325 mesh |
| Temperature | 550°–650° F. |
| Pressure | 5–25 atm. abs. |
| Ratio CO:$H_2$ | 0.5–1.3:1 |
| Space velocity (volume of gas/volume of catalyst/hr., measured at 60° F. and 1 atm. abs.) | 500–1500 |
| Superficial gas velocity | 1.0–3.0 ft./second |
| Rate of complete catalyst replacement | 100–400 days |
| Rate of conversion (based on CO+$H_2$ in original feed gas): | |
| 1st stage (reactor 220 | 50–80% |
| 2nd stage (reactor 210 | 50–20% |

It will be understood that, if desired, more than two reactors of the type of reactors 210 and 220 may be made to cooperate with each other and their auxiliary equipment in the manner shown in Fig. 2. Thus, catalyst withdrawn from reactor 220 may be passed to a further reactor supplied with fresh synthesis gas and equipped with a product and catalyst recovery system as shown, tail gas from such third reactor entering reactor 220 through line 240. Or, reactor 210 may receive its catalyst from another stage to which fresh catalyst and tail gas from reactor 210 is supplied. The two-reactor system shown in Fig. 2 is intended merely to illustrate a typical arrangement permitting the performance of a multi-stage procedure in accordance with my invention.

While I have shown the use of coolers, scrubbers, settlers and filters to remove entrained catalyst from the reaction gases, I do not wish to limit myself to these specific means. Any other means affording substantially complete separation of entrained solids from gases, such as high efficiency, multi-stage combined electrical and centrifugal gas-solids separators or the like, may in many cases successfully be used in place of or in cooperation with the separating means specifically described and illustrated.

I have also shown only true and complete countercurrent flow of gas and catalyst in the foregoing description, but it will be understood that I may adjust gas compositions and catalyst material proportions by withdrawal or extraneous addition of streams between stages, and that gas recycle, as desired, around a single stage or between stages may be practiced without departing from the spirit of my invention.

While the foregoing description and exemplary operations have served to illustrate specific applications and results of my invention, other modi-

I claim:

1. The method of controlling catalyst activity in the catalytic synthesis of hydrocarbons from CO and $H_2$, employing the fluid catalyst technique, which comprises passing a synthesis gas comprising CO and $H_2$ in synthesis proportions through at least two separate conversion zones in series decreasing in volume in the direction of flow of said synthesis gas, maintaining individual dense fluidized beds of finely divided synthesis catalyst in each of said zones at synthesis conditions, converting a portion of said synthesis gas to hydrocarbons in each of said conversion zones, feeding relatively fresh finely-divided synthesis catalyst to the last of said conversion zones passed through by said synthesis gas, circulating finely-divided synthesis catalyst of a relatively high average activity from said last conversion zone to the preceding conversion zones in a direction opposite to the flow of synthesis gas so as to establish in said conversion zones fluidized catalyst beds of decreasing average activity in said direction, withdrawing finely-divided synthesis catalyst of relatively low average activity from the conversion zone first passed-through by said synthesis gas and preventing catalyst of any individual zone from building up in any zone subsequently passed-through by said reactants.

2. The method as claimed in claim 1 wherein finely-divided catalyst entrained in said reactants is completely removed from said reactants between said separate zones.

3. The method as claimed in claim 1 wherein the rate at which catalyst is passed through said zones is increased as the rate of catalyst deactivation in said conversion increases.

4. The method as claimed in claim 1 wherein said catalyst circulation is so controlled as to maintain the catalyst volumes in said conversion zones substantially constant.

5. The method as claimed in claim 1 in which the synthesis gas passed through said conversion zones contains entrained synthesis catalyst, causing a catalyst carry-over from conversion zone to conversion zone in the direction of the synthesis gas flow and wherein the rate of said catalyst circulation is substantially higher than the rate of said catalyst carry-over.

6. The method of controlling catalyst activity in the catalytic synthesis of hydrocarbons from CO and $H_2$, employing the fluid catalyst technique, which comprises passing a synthesis gas containing about 0.2–0.8 mol of CO per mol of $H_2$ through at least two separate conversion zones in series, maintaining individual dense fluidized beds of finely-divided cobalt catalyst having a particle size of about 15–60% through 400 mesh in each zone, maintaining in each zone a temperature of about 357°–450° F., a pressure of about 5–10 atm. abs., a space velocity of about 200–500, and a superficial gas velocity of not greater than about 1.5 ft. per second, converting a portion of said synthesis gas in each zone, permitting finely-divided catalyst entrained in said synthesis gas to pass from one to another of said zones, feeding cobalt catalyst of said particle size and of relatively high activity to the last zone passed-through by said synthesis gas, circulating finely-divided cobalt catalyst from said last zone through the preceding zones in series in a direction opposite to the flow of the synthesis gas and at a rate substantially higher than that of entrained finely divided catalyst passing in the opposite direction so as to establish in said zones fluidized catalyst beds of substantially constant volume but decreasing average activity in said direction, withdrawing finely-divided cobalt catalyst of relatively low average activity from the zone first passed-through by said synthesis gas, and controlling said catalyst feed and withdrawal so as to replace completely the catalyst in all zones within a time of about 10–50 days.

7. The method of controlling catalyst activity in the catalytic synthesis of hydrocarbons from CO and $H_2$, employing the fluid catalyst technique, which comprises passing a synthesis gas containing about 0.5–1.3 mols of CO per mol of $H_2$ through at least two separate conversion zones in series, maintaining individual dense fluidized beds of finely-divided iron catalyst having a particle size of about 15–60% through 400 mesh in each zone, maintaining in each zone a temperature of about 550°–650 F., a pressure of about 5–25 atm. abs., a space velocity of about 500–1500, and a superficial gas velocity of about 1.0–3.0 ft. per second, converting a portion of said synthesis gas in each zone, completely removing finely-divided catalyst entrained in the synthesis gas in one zone, prior to its passage to another zone, feeding iron catalyst of said particle size and of relatively high activity to the last zone passed-through by said synthesis gas, circulating finely-divided iron catalyst from said last zone through the preceding zones in series in a direction opposite to the flow of the synthesis gas so as to establish in said zones fluidized catalyst beds of substantially constant volume but decreasing average activity in said direction, withdrawing finely-divided iron catalyst of relatively low average activity from the zone first passed-through by said synthesis gas, and controlling said catalyst feed and withdrawal so as to replace completely the catalyst in all zones within a time of about 100–400 days.

8. The method as claimed in claim 6 wherein the volumes of said zones decrease in the direction of the flow of synthesis gas so as to maintain the reaction conditions substantially constant throughout said zones.

9. The method as claimed in claim 7 wherein the volumes of said zones decrease in the direction of the flow of synthesis gas so as to maintain the reaction conditions substantially constant throughout said zones.

10. The method of claim 7 wherein said complete removal of finely divided catalyst between zones is accomplished by liquid scrubbing of said synthesis gas between zones.

11. The method of controlling catalyst activity in the catalytic synthesis of hydrocarbons from CO and $H_2$, employing the fluid catalyst technique, which comprises passing a synthesis gas comprising CO and $H_2$ in synthesis proportions through at least two separate conversion zones in series, maintaining individual dense fluidized beds of finely-divided synthesis catalyst in each of said zones at synthesis conditions, converting a portion of said synthesis gas to hydrocarbons in each of said conversion zones, feeding relatively fresh finely-divided synthesis catalyst to the last of said conversion zones passed-through by said synthesis gas, circulating finely-divided synthesis catalyst of a relatively high average activity from said last conversion zone to the preceding conversion zones in a direction opposite to the flow of synthesis gas so as to establish in said conversion zones fluidized catalyst beds of decreasing average activity in said direction, withdrawing finely-divided synthesis catalyst of relatively low average activity from the conversion zone first passed-through by said synthesis gas and preventing catalyst of any individual zone from building up in any zone subsequently passed-through by said reactants by liquid scrubbing of product gases and vapors between individual zones.

FRANK T. BARR.

REFERENCES CITED

The following references are of record in the file of this patent:

UNITED STATES PATENTS

| Number | Name | Date |
|---|---|---|
| 2,159,140 | Eckell | May 23, 1939 |
| 2,243,869 | Keith | June 3, 1941 |
| 2,367,281 | Johnson | Jan. 16, 1945 |
| 2,385,326 | Bailey | Sept. 25, 1945 |
| 2,393,909 | Johnson | Jan. 29, 1946 |
| 2,416,730 | Arveson | Mar. 4, 1947 |
| 2,438,728 | Tyson | Mar. 30, 1948 |